PROCESS FOR CONTROLLING GAS PHASE COMPOSITION

Filed Dec. 11, 1961

INVENTOR
H. C. THEUERER
BY George S. Indig
ATTORNEY

United States Patent Office 3,321,278

Patented May 23, 1967

3,321,278

PROCESS FOR CONTROLLING GAS PHASE COMPOSITION

Henry C. Theuerer, New York, N.Y., assignor to Bell Telephone Laboratories, Incorporated, New York, N.Y., a corporation of New York Filed Dec. 11, 1961, Ser. No. 158,246
15 Claims. (Cl. 23—204)

Figure 1:
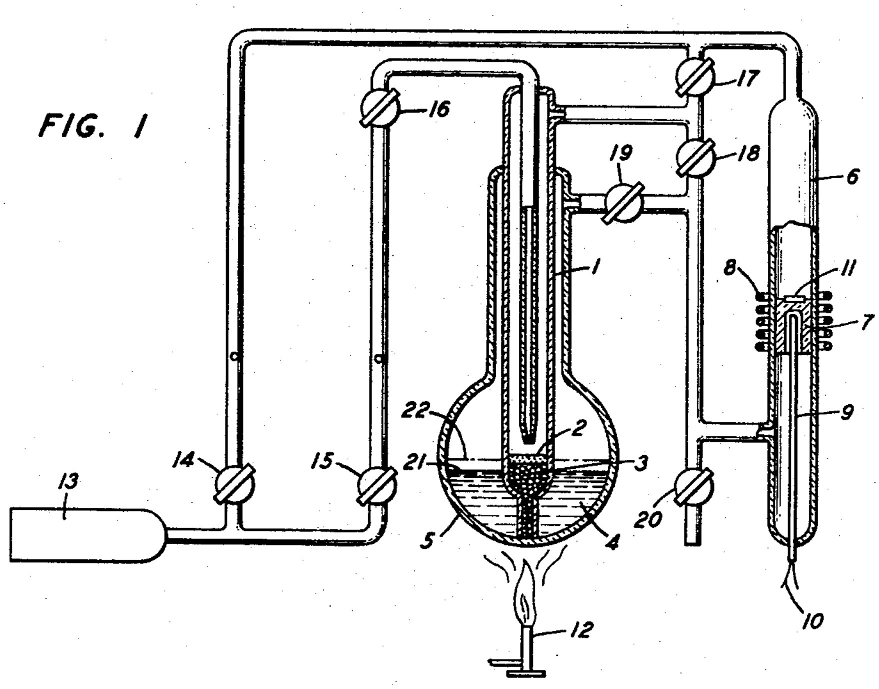

This invention relates to processes for controlling composition of a vapor phase containing two or more components. These processes are applicable to any materials which may be caused to undergo a phase transformation from liquid to vapor, whether by evaporation or reaction or any other mechanism. The invention is of particular interest in the control of a vapor phase which is eventually condensed to produce crystalline or amorphous growth. Such procedures are presently of interest in the manufacture of epitaxial layer devices.

The development of the transistor and of other devices in which electrical or magnetic behavior is intimately associated with composition has stimulated the development of various procedures permitting the precise control of composition. One of the more significant of these procedures is zone melting (see Zone Melting, W. G. Pfann, John Wiley and Sons, Inc., 1958). In accordance with this process, the differing distribution coefficients of two or more materials across liquid-solid interfaces, ordinarily resulting in varying composition in the crystallizing phase from a liquid, are either overcome or utilized to advantage by producing a moving liquid zone of very small relative dimensions and causing crystallization to proceed generally under controlled conditions from this zone. This process is now in universal use, and variations, all described in the above-noted reference, may result in constant composition freezing, variable composition freezing or refining.

Recently, workers in the semiconductor art have manifested an increasing interest in epitaxial growth processes. In accordance with these methods, vapor-phase materials are condensed, generally on single crystalline substrates, under conditions such that the growth layer exhibits the crystalline habit of the substrate. In the semiconductor arts, both substrate and epitaxial layer are semiconductive and may be of the same fundamental composition. Transistor, or generally device, action is produced in the epitaxial layer itself, with the substrate acting only as an electrical contact, so resulting in certain electrical advantages over conventional devices, mainly due to the extremely thin, controllably dimensioned semiconductor regions. Variations in these procedures permit variations in resistivity and/or conductivity type, either within the same layer or in subsequent growth layers. Film growth procedures are of interest in other fields as, for example in the superconductor art in which thin superconductive films may manifest increased values of critical current, critical fields, and critical temperature in accordance with the now-published dependence of these parameters on dimension.

Film growth procedures may make use of any of several techniques for causing the phase transformations necessary to transfer material from source to substrate. Such techniques include simple evaporation, cathodic sputtering, and the use of reactive or non-reactive carrier gasses. One of the more common procedures, now in commercial use in the growth of both silicon and germanium epitaxial devices, utilizes chlorides as the initial ingredients, with the liquid to vapor transformation being produced by use of a hydrogen carrier so that the vapor is large silicon tetrachloride or silicon chloroform; and reduction over a hot substrate to permit growth of the elemental materials. See, for example, Journal of the Electrochemical Society, Volume 108, pages 649 to 653, July 1961.

It is apparent that the same precise control of composition is required in the epitaxial growth layer as is required in devices manufactured by conventional techniques. Where the objective is to produce resistivity gradients or p-n junctions during growth, the need for precise control is obvious. Where active junctions or gradients are to be produced by subsequent diffusion or other procedure, reproducibility and a reasonable yield demand near-identical composition from layer to layer so as to permit predictable results during such subsequent processing.

The difficulty of producing controlled composition in epitaxial layers is compounded by the variation in volatility in components used to produce a given layer. Such variation, which may be expressed in terms similar to those familiar in the well-known normal freezing and zone melting equations, results in an equilibrium vapor phase which differs from that of a liquid source. Whereas such variation could be tolerated were it to be constant, it, of course, results in a depletion of more volatile component or components from the liquid, so resulting in variable vapor phase composition and consequent variation of composition in the growth layer. These conditions are recognized universally by workers in the art, who have sometimes resorted to careful metering of components to result in acceptable growth composition constancy. It is, however, apparent that a general solution for control of vapor-phase composition in equilibrium with the liquid source is needed.

In accordance with this invention, there is described a procedure for reliably producing, on a continuous basis, a vapor phase which, under steady state conditions, consists in its entirety of or, where carriers are used, includes a composition identical to that of the liquid phase from which it is produced. Where the vapor phase is to be used for solid growth, as in accordance with the epitaxial technique, condensation necessarily results also in a controlled composition. In addition, the inventive procedure may be made to serve other of the known uses to which zone melting is put. For example, perturbations in growth conditions temporarily upset equilibrium, and with appropriate composition may result in variations in resistivity and/or conductivity type in a condensed layer.

The procedures of this invention involve the passage of liquid source material through a diffusion barrier by capillarity, and the formation of a vapor phase from the barrier surface out of contact with the source.

The objective in steady state evaporation is to promote evaporation from the surface of a liquid column under conditions such that the evaporating material is initially enriched with respect to a component or components of higher vapor pressure. Under these conditions, diffusion in the liquid results in an exponential concentration gradient in the region near the surface, steady state being attained when the composition of the liquid surface is such that the composition of the vapor phase in equilibrium with the liquid is that of the bulk liquid. Of course, this condition does not obtain where evaporation or other vapor-forming mechanism is permitted to proceed from the free surface of a liquid body. Any attempt to produce such a concentration gradient in the body is thwarted by liquid flow which is only compounded by the thermal or mechanical agitation of the liquid resulting by use of a gaseous carrier. The instant processes overcome this condition by means of a diffusion limited barrier which takes the form of a capillary flow path through which the liquid must, of necessity, pass before undergoing transformation to the vapor phase.

In a preferred embodiment, capillary flow is assured by use of a porous glass frit filter which effectively blocks thermal and mechanical agitation. Alternative configurations include bundles of capillary tubes, bundles of rods, layers of particulate matter, and other porous media such as blotting paper.

Much of the discussion herein is in terms of semiconductive systems, it being expected that it is in such art that the instant processes will be initially applied on a commercial scale. However, it will be apparent that the inventive procedures are applicable to any two or more component systems capable of undergoing a phase transformation from liquid to vapor without undesirable reaction, and that the procedures will be usefully so applied where there is a volatility difference between any two components. Although a primary use is in the growth of epitaxial films, where the controlled composition vapor phase is merely an intermediate product, it is likely that interest will develop in fields in which the vapor phase composition itself is the end product. Semiconductive systems to which these processes are suitably applied include the usual germanium and silicon solutions containing one or more significant impuries, as well as the III–V and II–VI intermetallic compounds generally. In the last two classes of materials, the control mechanism made possible in accordance with this invention is valuable not only in controlling the amount of any significant impurity that may be presented but also in assuring formation of the stoichiometric intermetallic compound itself. As has been noted, there is at this time a growing interest in the formation of superconducting films. A specific example is directed to the formation of a film of stoichiometric $V_3Si$. This is a particularly difficult composition to grow by the well-known chlorine reaction-hydrogen reduction procedure since silicon tetrachloride is of the order of forty times more volatile than is vanadium chloride. Other superconductors, including compounds such as $Nb_3Sn$ and alloys of the system Nb-Ti, may be grown with equal facility.

Figure 2A:
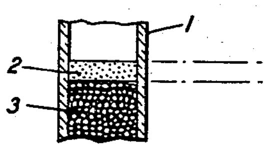
Figure 2B:
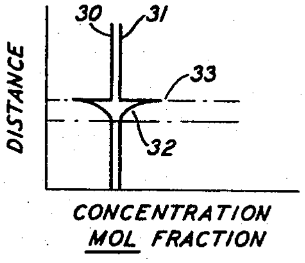
Figure 3:
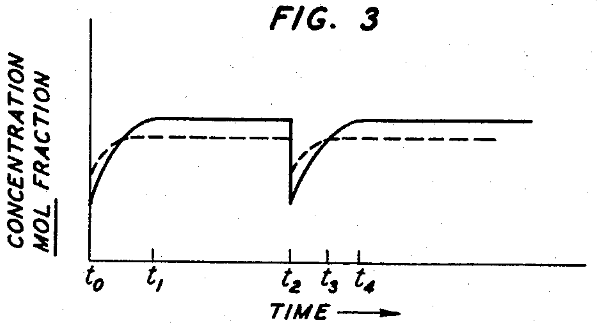

Reference is had to the drawing in the detailed description of this invention in which:

FIG. 1 is a front elevational view, partly in section, of an apparatus suitable for use in the practice of the invention;

FIGS. 2A and 2B are, respectively, a front elevational view of the section of the apparatus of FIG. 1 containing the diffusion barrier, and a plot of the corresponding distance along the section against concentration as a mol fraction for an exemplary solution; and FIG. 3, on coordinates of concentration expressed as a mol fraction versus time, shows the variation of concentration of the vapor phase of a two-component system as a function of time for a perturbation method herein.

Referring again to FIG. 1, the apparatus shown is suitably used for carrying out any of the species of this invention although, as will be seen, certain portions of the apparatus may be closed off under certain circumstances. The apparatus shown, which may be made of glass or any other material having the suitable chemical and temperature characteristics, includes evaporation chamber 1 provided with a fritted glass or other capillary barrier 2, which is conveniently wetted with the assistance of glass beads 3. The open-ended bottom of evaporation chamber 1 is immersed in liquid source body 4, which is retained within flask 5. The apparatus depicted is provided with tube 6, which may receive exiting vapor-phase material from evaporation chamber 1, further containing conventional apparatus for film growth by hydrogen reduction, including substrate support 7, heating means 8, which may take the form of an induction coil, and quartz support 9, in turn containing thermocouple 10. A substrate wafer 11 is shown atop support 7.

Since reference is made to FIG. 1 in the general description of the invention, alternate means including both the heating source 12 and carrier supply 13 are both depicted. Stopcocks 14, 15, 16, 17, 18, 19 and 20 are provided to regulate gaseous flow through the apparatus.

Two liquid levels, depicted by solid surface line 21 and broken surface line 22, are shown. It has been found convenient to operate with a level below the bottom of the diffusion barrier such as that shown by surface line 21. The tubulation through which the feed liquid reaches the frit is optionally filled with glass beads which prevent bubble formation at the underside of the frit, and by restricting the volume of the feed chamber increases the effective length of the diffusion barrier. Where the level is below the diffusion barrier, it is necessary initially to force the liquid source material 4 to the lower surface of the diffusion barrier. This may be accomplished by applying hydrogen pressure to the reservoir. After contact is made, the pressure within the reservoir and evaporation chamber is then equalized, so allowing any residual surface liquid to drain back into the reservoir. Due to capillarity, the liquid column remains in contact with the diffusion barrier and the upper surface is maintained wet. In accordance with this technique, the spacing between the bottom of the diffusion barrier and the upper surface of the liquid source is not critical since capillarity and the cohesive strength of the liquid supports the column in contact with the barrier against an appreciable gravity head. This step is, of course, dispensed with when liquid level, such as 22, is maintained above the lower surface of the diffusion-limited barrier, although it may be found desirable under such circumstances to minimize the formation of bubbles by agitation. Alternatively, the liquid level in the reservoir may be above the level of the frit, the allowable height of the head being that which is just insufficient to overcome the capillary forces which prevent rise of the liquid above the top surface of the frit.

After these preliminary operations, the vapor phase transformation is initiated either by evaporation, perhaps assisted by a heating source such as 12, or by use of a carrier, as from supply 13. Where it is desired to maintain uniform composition in a growing film on substrate 11, phase transformation is continued for a short buildup period, during which time the vapor phase is exhausted by opening petcocks 18 and 20. Following this buildup period, the vapor material is passed through petcock 17 and is caused to condense on wafer 11 by any suitable means such as the thermal-hydrogen reduction procedure involving the use of the apparatus shown.

FIG. 2A depicts a section of the apparatus of FIG. 1 and includes diffusion barrier 2 atop support 3 within vapor chamber 1.

FIG. 2B, in ordinate distance units, corresponding with those for the section shown in FIG. 2A, and abscissa units of concentration expressed as a mol fraction based on the composition in the liquid shows the steady state variation in composition along the column for a two-component system containing more volatile component 30 and less volatile component 31. Proceeding from the bottom upwardly, it is seen that the relative concentrations of ingredients 30 and 31 are constant through the liquid and into the lower portion of the diffusion barrier 2. Starting at some position such at 32 in the barrier, it is seen that the concentration of less volatile component 31 increases exponentially, attaining a maximum value at a position 33 corresponding with the upper surface of diffusion barrier 2. Here, concentration of ingredient 31 drops off sharply to the value which obtains in the liquid, where it remains fixed in the vapor phase. More volatile ingredient 30 varies in the inverse manner, attaining a minimum at 33.

The condition shown graphically in FIG. 2B is that which obtains at equilibrium, a condition which is achieved for an ideal solution when the composition at the surface of the diffusion barrier 2 (position 33) is equal to:

$$\frac{N_{a_v}}{N_{b_v}}=\frac{N_{a_l}}{N_{b_l}}\cdot\frac{p_a^\circ}{p_b^\circ} \qquad (1)$$

where $\frac{N_{a_l}}{N_{b_l}}$=mol ratio of components in liquid phase, $\frac{N_{a_v}}{N_{b_v}}$=mol ratio of components in vapor phase, $p_a^o$=vapor pressure of pure component $a$, and
$P_b^o$=vapor pressure of pure component $b$.

It may be noted that this distribution equation is in form identical to the familiar zone melting equation:

$$C_s=C_1k \qquad (2)$$

in which $C_s$=mol fraction of a component in the crystallizing solid,
$C_1$=mol fraction of the feed liquid at the trailing interface,
$k$=the distribution coefficient across the interface.

By analogy, the ratio $p_a^o/p_b^o$ may be considered as representing a distribution coefficient $k$ and therefore as predicting the ratio of the equilibrium concentration of a component in the surface and in the bulk liquid.

In FIG. 2B, the equilibrium concentration of less volatile component 31 attains a maximum at position 32 which is equal in its concentration in the bulk liquid multiplied by the ratio of its vapor pressure to that of the less volatile component 30.

The sole requirement for the attainment of the steady state conditions such as shown in FIG. 2B is that the capillary barrier and flow rate be such that the concentration gradient defined in FIG. 2B as that section between positions 32 and 33 be contained within the barrier. For a given barrier, the limiting flow conditions are those which result in a diffusion layer thickness equal to the length of the barrier. Methods for computing diffusion layer thickness have been reported (see, for example 33 Canadian Journal of Physics 723 [1955]). In general the barrier length should be at least 7 times the layer thickness $\delta$ and may be calculated from the characteristic diffusion distance $\delta$ given by the equation:

$$\delta=\frac{d}{r} \qquad (3)$$

where $d$=diffusivity in cm.$^2$/second, and
$r$=flow rate in cm./second.

Diffusivities for many liquids are reported in the literature (see, for example, "Diffusion in Solids, Liquids and Gases," W. Jost, 3rd printing [1960], Academic Press, N.Y., page 474 et seq.). However, for design purposes it may be noted that liquid diffusivities seldom vary by more than a factor of 3 from the figure of $3\times10^{-5}$ cm.$^2$/sec. It may, therefore, be assumed that the diffusivity lies between $1\times10^{-5}$ and $1\times10^{-4}$, so indicating a minimum permissible flow rate of $7\times10^{-4}$ cm./sec./1 cm. barrier length. The determination of flow rate through a particular capillary barrier is dependent upon the average cumulative capillary cross section. Such value is readily determined for a bundle of capillary tubes and is generally available from the manufacturer for porous bodies such as fritted glass. It is seen that there is no theoretical upper limit on flow rate through the capillary barrier since from Equation 3 it is seen that increasing the flow rate merely results in minimizing the thickness $\delta$ of the diffusion layer. A practical limit is imposed by the maximum rate at which phrase transformation from liquid to solid can be brought about at the surface of the barrier.

It will be recognized that perturbation of the steady state evaporator will result in temporary shifts in solute composition and that following perturbation the system will return to the initial steady state condition. Purposeful perturbation of the steady state evaporator during the course of epitaxial film growth results in composition changes which in the case of semiconductors can result in single or multiple p-n junctions. The steady state evaporator can be perturbed by either changing the evaporation rate or changing the flow of reservoir liquid to the diffusion barrier. Increasing the evaporation rate as by increasing the flow of carrier results in increasing the concentration of solutes with lower vapor pressures than the solvent and decreases the concentration of higher vapor pressure solutes. Decreasing the evaporation rate as by reducing the carrier flow has the converse effect. With the evaporation rate constant the flow of feed so as to build up a liquid layer on the upper surface of the barrier may be increased by a pressure surge on the reservoir. Flooding the diffusion barrier results in a sharp increase in concentration of solute with higher vapor pressure than the solvent, and corresponding decrease in concentration for lower vapor pressure solutes. Partially draining the diffusion barrier by a pressure surge on the evaporation chamber temporarily depletes the liquid in the diffusion barrier and results in composition changes the converse of those stated immediately above.

FIG. 3 is illustrative of the use of the perturbed steady state evaporator. This figure is a plot of concentration expressed in mol fraction against time showing the concentration of each of two components of a three-component system in the vapor phase leaving the upper surface of the capillary barrier. The particular system depicted contains solutes 40 and 41 in a solvent, not shown. Both of solutes 40 and 41 are less volatile than the solvent, with solute 40 being less volatile than solute 41. At time $t_0$, the vapor phase leaving the top of the barrier contains concentrations of solutes 40 and 41 which may be represented as less in value than the concentrations in the initial liquid. During the period equal to the period between time $t_0$ and $t_1$, the concentrations of 40 and 41 build up exponentially until at time $t_1$ the vapor phase in equilibrium with this liquid has the composition of the liquid reservoir. Steady growth conditions are maintained from time $t_1$ to $t_2$, so resulting in constant composition, evidenced by the horizontal lines in that period. At time $t_2$, the vapor phase composition is abruptly changed by flooding the diffusion-limited barrier with reservoir liquid which may be accomplished by momentarily closing petcocks 17, 18 and 20 and opening 19. This returns the vapor phase concentrations of 40 and 41 to essentially those which initially obtained at time $t_0$, almost instantaneously. Allowing excess liquid to drain back into the reservoir by equalizing the pressure between the reservoir and evaporator allows the liquid concentrations at the upper surface of the barrier to build up, attaining that shown over the period represented by time $t_0$ to time $t_1$, and in an equal period of time $t_2$ to $t_4$, buildup is complete, so that subsequent vapor again has the composition of the liquid.

Although the conditions represented by the plot shown on FIG. 3 have been discussed in terms of constant flow rate before and after the perturbation at time $t_2$, within the limits discussed in conjunction with FIG. 2B, that is, in which the barrier is of a flow path length at least equal to the barrier length, equilibrium concentrations identical to those which obtain in the liquid are attained in the vapor regardless of flow rate. Since, however, $\delta$ varies inversely as flow rate, a lesser amount of less volatile component is required in the gradient and this, coupled with the increase itself, results in a decrease in the buildup interval $t_0$ to $t_1$ and $t_2$ to $t_4$.

FIG. 3 may be considered as representing appropriate conditions for the growth of a semiconductor n-p-n or p-n-p junction. Assuming component 40, the least volatile solute to represent a p-type significant impurity-containing compounds such, for example, as $BBr_3$ in $SiCl_4$, and 41 to represent an n-type impurity-containing compound such as $PCl_3$ in $SiCl_4$, it is seen that the growth layer corresponding with period $t_1$ to $t_2$, and also that period after $t_4$, represents constant resistivity p-type material, while that portion of the layer resulting from vapor formed during interval $t_2$ to $t_3$ represents n-type material. As discussed, thickness of the n-type layer may be varied by varying the flow rate, thinner regions resulting from faster flow rates. The procedure may be repeated any number of times, so resulting in the desired number and spacing of multiple p-n junctions.

The procedure discussed in conjunction with FIG. 3 is analogous to the process known as "rate growing with melt back," in accordance with which (1) crystallizing material is grown at a given rate, (2) the growth procedure is stopped and the crystallized portion reimmersed so that a surface is remelted, and (3) growth at the original rate is continued. The general requirement for this procedure is that the least volatile solute be that which predominates in the initial liquid. Junctions may be produced by a procedure analogous to rate growing without melt back. As in conventional crystal growing, this procedure does not result in as sharp a step junction as that attainable with melt back. Junctions may be produced either by increasing the flow rate for a system in which the most volatile solute predominates in the initial liquid or, for systems in which the least volatile solute predominates in the initial liquid, by decreasing the flow rate.

The rate of buildup as, for example, that interval represented by $t_0$ to $t_1$ in FIG. 3 is determined also by the diffusivity and flow rate. The general condition has been considered and is reported in the literature by V. G. Smith, W. A. Tiller, and J. W. Rutter, in Canadian Journal of Physics, 33, 723, 1955. In general, buildup has been found to be extremely rapid, generally occurring in periods a minute or less.

Although discussion of perturbation growth as, for example, in accordance with the process of FIG. 3 has been in terms of creation of one or more p-n junctions in the instance of semiconductors, it is apparent that the procedure may be operated in such manner as to result in a resistivity gradient without such junction. Such a gradient is most easily obtained by operating with systems complementary to those discussed in conjunction with the processes analogous to rate growing with and without melt-back. So, for example, gradients result by decreasing the flow rate for a system in which the least volatile solute predominates in the initial liquid for rate growing with melt-back, or by increasing the flow rate for a system in which the most volatile solute predominates for rate growing without melt-back. Alternatives include perturbation in a single solute system. Two specific examples are presented below. The first of these is concerned with film growth of the superconducting compound $V_3Si$. The second is directed also to epitaxial growth, however of a solid state semiconducting solution containing $SiCl_4$ and $PCl_3$ to prepare controlled resistivity n-type films.

*Example 1*

The reservoir, such as 5 of the apparatus shown in FIG. 1 was filled to level 21 with a mixture of vanadium tetrachloride and silicon tetrachloride in the mol ratio three to one. Hydrogen pressure was applied until the lower surface of the fritted glass diffusion barrier was wetted. Hydrogen flow was initiated by opening the appropriate petcocks and was continued, with material being exhausted for about ten minutes, after which vapor was permitted to flow over the top of MgO substrate wafer 11. The wafer was maintained at a temperature of approximately 1000° C., as indicated by a reading taken through the thermocouple, so that the vapor phase mixture was condensed. The flow was continued for a period of approximately five minutes, resulting in a layer thickness of approximately one micron. X-ray analysis shows the structure for $V_3Si$, and the films have critical temperatures between 15.7 and 16.4° K., characteristic temperatures for this material.

*Example 2*

The reservoir, such as 5 of the apparatus shown in FIG. 1, was filled to level 21 with a mixture of 100 p.p.m. of $PCl_3$ in $SiCl_4$. Hydrogen pressure was applied until the lower surface of the fritted glass diffusion barrier was wetted. Hydrogen flow was initiated by opening the appropriate petcocks and was continued, with material being exhausted for five to ten minutes after this vapor was permitted to flow over the top of substrate wafer 11, also made of silicon. The wafer was maintained at a temperature of approximately 1150–1200° C., as indicated by a reading taken through the thermocouple, so that the vapor phase mixture was condensed. The flow was continued for a period of approximately 20 minutes, resulting in a layer thickness of approximately 10 microns. Microscopic examination revealed the layer to be epitaxial. The epitaxial layer was n-type silicon with a resistivity of about 0.5 ohm cm.

The inventive processes have been described in terms of a limited number of embodiments. The inventive teaching is, however, concerned broadly with the use of a diffusion limited barrier, so permitting the buildup of a concentration gradient of less volatile ingredient in apparatus such that liquid must flow through the barrier before being transformed to the vapor phase. The use of such a barrier results in a steady state vapor phase composition identical to that of the liquid. This condition obtains under steady state conditions regardless of the method for causing the transformation. Feasible mechanisms include reduced pressure, heating, and the use of both inert and reactive carrier gases. The processes are broadly applicable to a wide range of materials, the only requirement for its beneficial application being the presence of at least two components of differing vapor pressure. For these purposes, a difference in vapor pressure of one percent, expressed as a percentage of the more volatile ingredient, is deemed sufficient to result in advantageous practice of the invention. The materials upon which the processes are operated must be capable of existing in the liquid phase, such liquid being either a solution of elements or of compounds which may eventually result in a desired end product. The desired end product may be the vapor itself or may be a crystallized or otherwise solidified body which, again, may be a mixture of elements and/or compounds, a solution such, for example, as a metallic alloy or a glass or a compound as illustrated by the $V_3Si$ of Example 1. Maintenance of any of the desired conditions, i.e., the presence of a liquid phase and the necessity for a phase transformation may necessitate or make desirable the operation of the entire process at a temperature other than room temperature.

What is claimed is:

1. Method for producing a solid containing at least two components which in the liquid state have different vapor pressures from a body of liquid solution comprising contacting a capillary flow path to the said body under conditions such that liquid in the said body flows through the said path by capillarity, transforming the said liquid of said components to a vapor at the end of the path removed from the said body at a rate substantially equal to the rate of liquid flow through the said path, and transforming at least a portion of the said vapor to a solid.

2. Method of claim 1 in which the flow rate through the said capillary flow path is such that the length of the said path in the flow direction is at least seven times as great as the diffusivity of the said liquid divided by the linear flow rate through the said path, all expressed in compatible units.

3. Method of claim 2 in which the capillary flow path is a body of fritted glass.

4. Method of claim 2 in which the flow rate and the transformation rate are both continued uninterrupted for a substantial period under conditions such that the relative concentrations of at least two components of the said liquid and the said vapor are substantially identical.

5. Method of claim 2 in which the said flow rate is at least once interrupted under conditions such that the composition of the said vapor is altered.

6. Method of claim 5 in which the said flow rate is increased under conditions such that the liquid level at the end of the capillary flow path removed from the said body is increased.

7. Method of claim 2 in which the said transformation rate is at least once interrupted under conditions such that the composition of the said vapor is altered.

8. Method of claim 2 in which the said transformation is produced by evaporation.

9. Method of claim 8 in which the said evaporation is accomplished by use of a carrier gas.

10. Method of claim 9 in which solid transformation is brought about by condensation.

11. Method of claim 9 in which solid transformation is brought about by chemical reaction of said components.

12. Method of claim 11 in which the solid is crystalline and is produced on the surface of a crystalline substrate.

13. Method of claim 12 in which the said substrate is a single crystal and in which the said solid is grown epitaxially.

14. Method of claim 9 in which the said solid is a mixture of elements.

15. Method of claim 9 in which the said solid comprises a compound.

References Cited by the Examiner

UNITED STATES PATENTS

| | | | |
|---|---|---|---|
| 1,497,417 | 6/1924 | Weber | 117—107 |
| 2,278,543 | 4/1942 | French | 203—40 |
| 2,552,626 | 5/1951 | Fisher et al. | 117—107 |
| 2,556,711 | 6/1951 | Teal | 117—107 |

OSCAR R. VERTIZ, *Primary Examiner.*

MAURICE A. BRINDISI, *Examiner.*

M. N. MELLER, H. S. MILLER, *Assistant Examiners.*